United States Patent [19]

Suarez

[11] Patent Number: 5,380,055
[45] Date of Patent: Jan. 10, 1995

[54] SHEET MATERIAL PULLER

[76] Inventor: Roderick A. Suarez, 4768 Stillwood Cove, Forest Park, Ga. 30050

[21] Appl. No.: 45,026

[22] Filed: Apr. 7, 1993

[51] Int. Cl.$^6$ .............................................. B66C 1/48
[52] U.S. Cl. ..................................... 294/16; 294/101; 294/131
[58] Field of Search ............... 294/1.1, 16, 101, 103.1, 294/114, 131, 901, 902

[56] References Cited

U.S. PATENT DOCUMENTS

| | | | |
|---|---|---|---|
| 1,917,663 | 7/1933 | Porter. | |
| 2,006,949 | 7/1935 | Hockensmith | 294/114 |
| 2,549,918 | 4/1951 | Miller | 294/901 X |
| 2,566,489 | 9/1951 | Grater | 294/101 X |
| 2,776,856 | 1/1957 | Ingram | 294/16 |
| 3,000,662 | 9/1961 | Scarlett | 294/16 X |
| 3,284,049 | 11/1966 | Haraden | 254/51 |
| 4,162,804 | 7/1979 | Davies | 294/101 |
| 4,349,225 | 9/1982 | Collins et al. | 294/16 |
| 4,795,202 | 1/1989 | Mader | 294/114 X |

Primary Examiner—Dean J. Kramer
Attorney, Agent, or Firm—Deveau, Colton & Marquis

[57] ABSTRACT

A sheet puller designed to move sheet metal stock having a rotatable offset cam with teeth which interacts with a pressure plate which holds the sheet to be moved, the teeth on the cam being designed to engage the sheet when the puller is moved in one direction and disengage the sheet when the puller is moved in the opposite direction, the sheet being received between a guide support top and a guide support base.

8 Claims, 3 Drawing Sheets

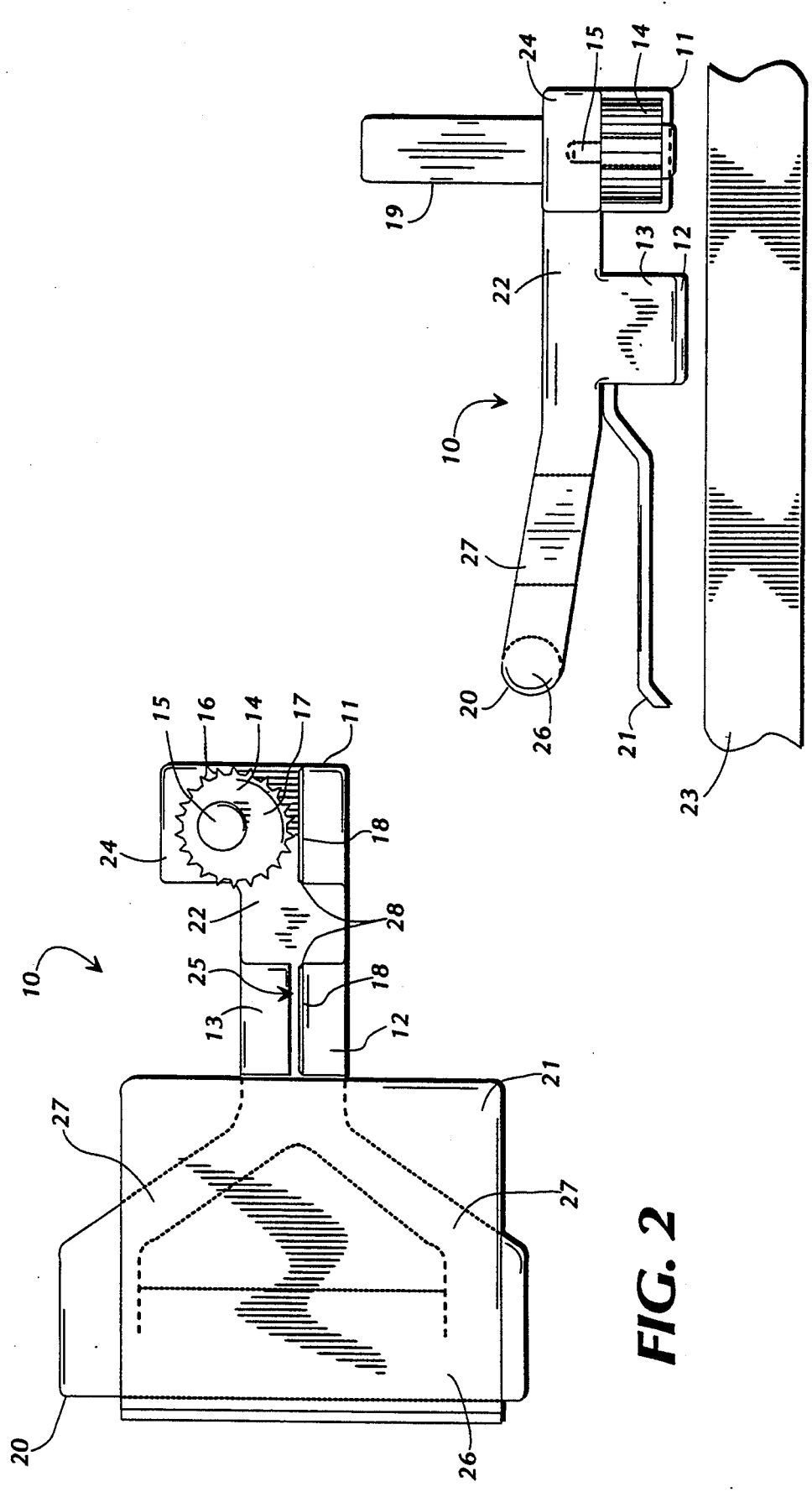

5,380,055

SHEET MATERIAL PULLER

BACKGROUND

1. Technical Field

The present invention relates generally to a hand operated puller for moving sheet material from one place to another. It is especially adapted for moving sheet metal stock off of a coil to a stamping machine.

Sheet metal is delivered to tool and die factories on a coil similar to a roll of paper towels. It is necessary for the workers to unroll the sheet metal and feed it into the stamping machine so that parts can be stamped from the metal. Workers currently use gloves or "C-clamps" to pull the metal stock so that it unwinds from the roll and is fed into the stamping machine. This is not only a difficult task, but many workers sustain hand injuries from handling the metal because the metal has relatively sharp edges and may have sharp spurs along the edges or in the sheet itself. It requires a considerable amount of effort to pull the metal from the spool because of the weight of and lack of flexibility in the metal. Workers are sometimes injured even when they use gloves, as sharp protusions of the metal can penetrate many types of gloves if the protrusion is sharp enough. The "C-clamps" take time to apply to the metal and remove once the metal is placed in the stamping machine. Often, the "C-clamps" must be applied to the metal more than once to pull the metal to the desired location. This increases the chance of injury to the worker.

2. Prior Art

U.S. Pat. No. 1,917,663 to Porter, issued on Jul. 11, 1933, discloses a gripper for gripping and holding a binder for packages. The binder can be either a steel strap or wire. The gripper basically consists of a stationary foot over which the binder passes. The moveable member of the gripper is a wedge shaped gripper block with teeth that engage the binder. The gripper block is mounted on an eccentric portion of a shaft which is attached to an operating handle. The eccentric portion of the shaft extends through an elongated hole in the block. In this way, rotation of the handle either lowers or raises the gripper block into or out of engagement with the binder. In effect, the Porter gripper is used to hold the binder material in tension so that it can be connected together to bundle or bind packages or groups of packages.

U.S. Pat. No. 3,284,049 to Haraden, issued on Nov. 8, 1966, discloses a feed wheel drive mechanism for strapping tools. It shows the use of a feed wheel which is mounted on an eccentric portion of a shaft. When the shaft is rotated it raises or lowers the feed wheel out of or into contact with the strap. A driving pawl turns the feed wheel to bring it into contact with the strap. A holding pawl is utilized to hold the strap in position. After releasing the driving pawl, the handle can be rotated to move the feed wheel out of contact with the strap. The Haraden strapping tool also is to pull and tension binder straps and, by use of cranks and levers, tension the binder strap, position the future ends of the binder strap relative to each other, and seals the ends together to bundle or bind packages.

Both of the Porter and Haraden tools, while capable of gripping relatively lightweight binding material, are for package binding, and are not designed or suitable for feeding relatively heavyweight sheet stock to an industrial stamping machine. Neither the Porter nor the Haraden devices can be used to pull metal off of rolls. Accordingly, it can be seen that a device is needed for pulling the metal from the roll to the stamping machine that would reduce the number of injuries to workers and to make the task easier. It would be desirable that this device be hand operated rather than motor driven in order to keep the cost lower, the technology simple and have fewer parts so as to increase reliability. It is to those goals and others which will become apparent that the present invention is directed.

SUMMARY OF THE INVENTION

Briefly described, in a preferred form the present invention comprises a sheet puller for pulling sheet material from one location to another. It is designed for pulling sheet metal stock from a coil to a stamping machine. It is especially useful for pulling, and thus unwinding, sheet metal stock from coils of metal stock. This device is referred to generally as a sheet material puller.

The puller has a frame with a pressure plate with a top surface on which the sheet metal stock rests. It has a guide support base which has a top surface in the same plane as the top surface of the pressure plate and a guide support top having a bottom surface above and in a plane parallel to the top surface of the guide support base and above the guide support base, defining a guide space [slot] between the guide support top and guide support base. The sheet metal stock is received in the guide space between the top surface of the guide support base and the bottom surface of the guide support top. The puller has a rotatable offset cam with teeth in the circumference of the cam. This cam is attached to a shaft which in turn is supported by the frame, the axis of the shaft being parallel to the plane of the pressure plate. The cam is located above the top surface of the pressure plate at such a distance so that when the lobe on the cam is nearly directly above the pressure plate the teeth will be engaged with the sheet metal stock. The teeth are engaged by pulling the sheet metal stock in one direction which results in the lobe of the cam being moved to a position nearly directly above the top surface of the pressure plate. The cam forces the sheet metal stock against the pressure plate thus holding the sheet metal stock within the puller by a combination of pressure and teeth engagement. After the sheet metal stock is moved to the stamping machine, the sheet metal stock can be pulled or pushed in the opposite direction to release it by causing the cam to rotate, disengaging the lobe and teeth from the sheet metal stock.

In its preferred form the puller has a front handle and a rear handle and a hand shield next to the front handle. This hand shield protects the hand from the sheet metal stock as it is being pulled and released. The puller also can be manufactured in mirror image pairs for use on the opposite edges of the sheet metal stock.

The present invention provides a hand held device for pulling sheet metal stock from a roll in an efficient and safe manner. It is more efficient than the "C-clamps" that have been used in the past as it requires no separate step to tighten the puller onto the sheet metal stock. It is safer than pulling with the hands because with the puller the hands do not touch the sheet metal stock and there are guards between the metal and the hands.

Accordingly, it is primary object of the present invention to provide a device for pulling sheet material from one place to another, and especially for pulling sheet metal stock from a roll to a stamping machine.

It is another object of the present invention to provide a safer and more efficient device for pulling sheet material stock from a roll or coil.

It is a further object of the present invention to provide a device that is lightweight, inexpensive and simple to operate.

Other objects, advantages, and features of the present invention will become apparent upon reading the following specification in conjunction with the accompanying drawing Figures, in which corresponding numerals designate corresponding parts throughout the several views.

BRIEF DESCRIPTION OF THE DRAWING FIGURES

FIG. 2 is a side view of the sheet material stock puller of this invention.

FIG. 3 is a top view of the sheet material stock puller of this invention.

DETAILED DESCRIPTION OF THE PREFERRED EMBODIMENT

Figure 1:
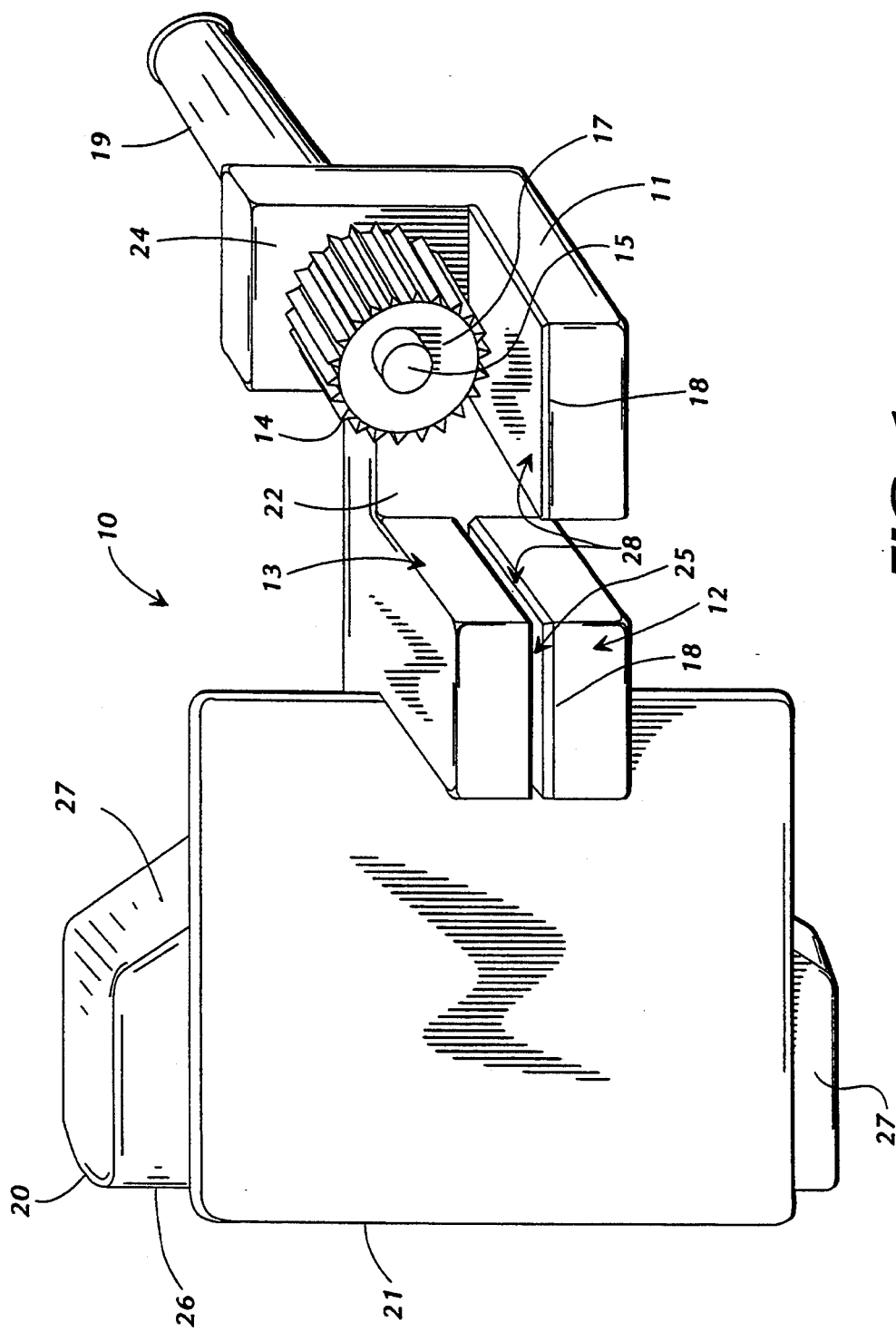
FIG. 1 is a side perspective view of the sheet material stock puller of this invention.

Referring now to the drawings in detail and in particular to FIG. 1, the sheet metal stock puller of the present invention has been designated in its entirety as 10. The puller 10 is configured to support and hold the edge of a length of sheet metal stock 23 in a predetermined position such that the sheet metal stock 23 can be pulled, typically from a supply roll (not shown) to an apparatus (not shown) which acts on the sheet metal stock 23. The puller 10 has handle means 19, 20 which the workers use to manipulate the puller 10 and, consequently, the sheet metal stock 23. The puller 10 also has a hand shield means 21 to protect the worker's hand from injury by preventing the sheet metal stock 23 from contacting the worker's hand when using the puller 10.

The puller 10 has a main support shank 22 supporting the major components of the puller 10. The following detailed description of the preferred embodiment is made relative to the normal feeding of sheet metal stock 23, namely from a coil of sheet metal stock 23 having a horizontal axis, being pulled in a horizontal planar fashion. Generally, the shank 22 has three sections: a distal gripping section comprising a toothed cam 14, a pressure base 11 and a rear handle 19; a central guiding section comprising a guide support top 13 and a guide support base 12; and a proximal handle section comprising a front handle 20 and a hand shield 21. The sheet metal stock 23, shown in FIG. 3, rests on pressure plate 11 as it is being pulled from a roll. The sheet metal stock 23 is kept in proper position in the puller 10 during the pulling by guide support base 12 and guide support top 13. The top surfaces 18 of pressure plate 11 and guide support base 12 are in the same horizontal plane. Guide support top 13 is located above guide support base 12 and in a parallel plane by a distance slightly greater than the thickness of the sheet metal stock 23 being pulled.

Figure 4:
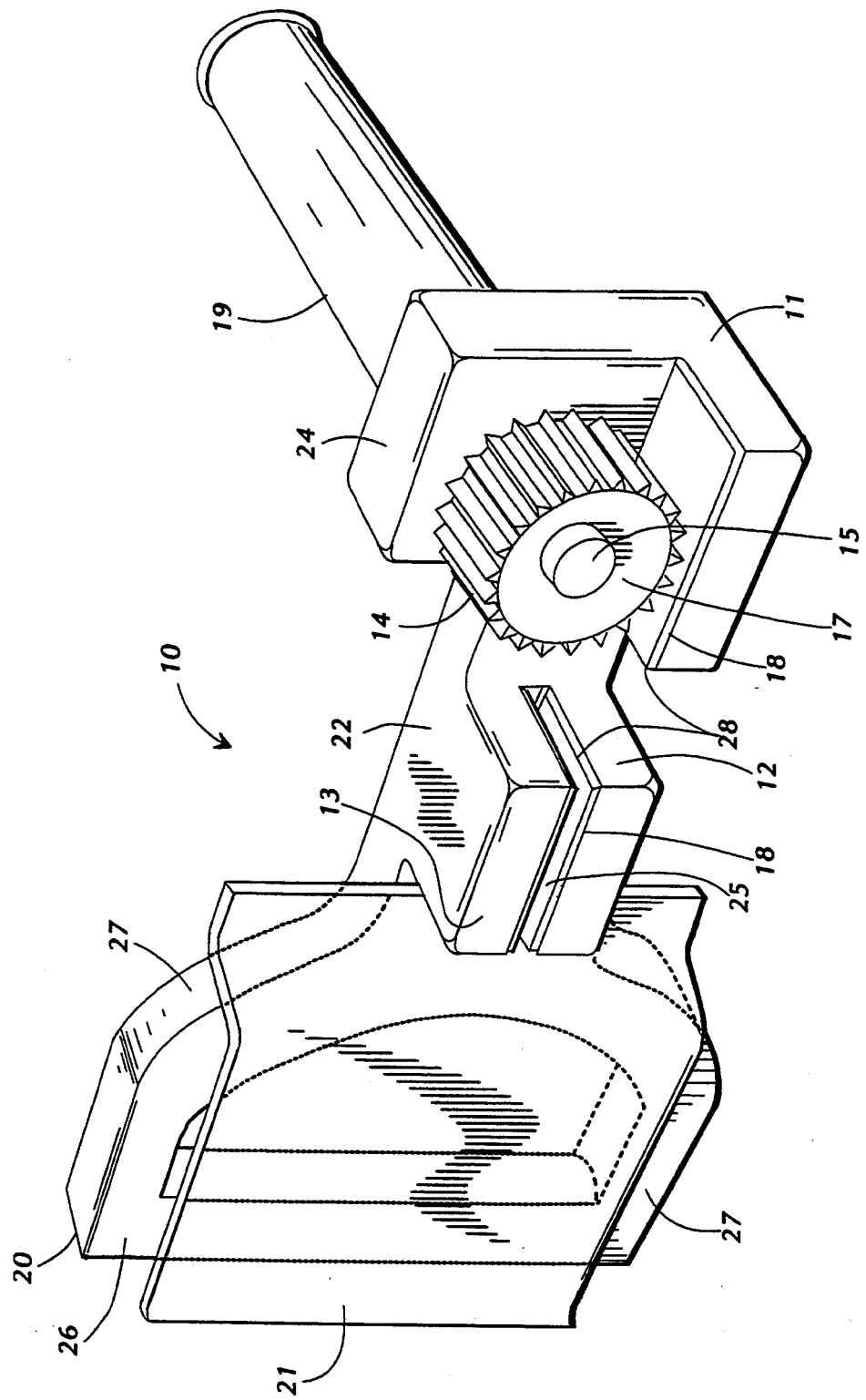
FIG. 4 is a perspective view of the sheet material stock puller of this invention.

The puller has an offset toothed cam 14 which rotates on a shaft 15. The cam 14 has a plurality of teeth 16 for engaging the sheet metal stock 23 and holding it firmly in position. The cam 14 is offset with a lobe 17, as shown in FIGS. 1, 2 and 4, being in the down position when the teeth 16 are engaged with the sheet metal stock 23. Shaft 15 is journaled in shaft housing 24, a generally upwardly extending vertical extension of the distal gripping section of shank 22. The axis of shaft 15 is parallel to the plane of pressure base 11, allowing cam 14 to rotate in a plane normal to pressure base 11 such that when cam 14 rotates, lobe 17 rotates toward or away from pressure base 11. Pressure base 11 is a generally inwardly extending horizontal extension of the distal gripping section of shank 22, located immediately below cam 14. Shaft 15 is journaled onto shaft housing 24 at a distance from pressure base 11 such that teeth 16 will pass immediately proximate to or touch pressure base 11 as cam 14 rotates about shaft 15 and the lobe 17 rotates toward pressure base 11. If too much space is present between teeth 16 and pressure base 11 when lobe 17 is in its downward most position, insufficient or no pressure will be imparted by teeth 16 to sheet metal stock 23 against pressure base 11, resulting in a lack of gripping.

Both guide support base 12 and guide support top 13 are generally inwardly extending horizontal extensions of the central guiding section of shank 22. Guide support top 13 is located immediately above and in a parallel plane to guide support base 12. Generally, guide supports 12, 13 are located a predetermined distance from pressure base 11 along shank 22 such that the combination of guide support base 12 and pressure base 11 will support sheet metal stock 23 without acting too much as a fulcrum. The distance between guide support base 12 and guide support top 13 defines a slot 25 into which the sheet metal stock 23 is placed, as more fully described below. Slot 25 has a height which will generally accommodate most common sheet metal stock thickness. Guide support base 12 and guide support top 13 cooperate to help maintain puller 10 in a constant position relative to sheet metal stock 23 during pulling, to prevent sheet metal stock 23 from excessive movement or flexing while being gripped in the puller 10, and to allow the sliding of the puller 10 along the sheet metal stock 23 during the release and repositioning mode. Guide support base 12 may extend inwardly from shank 22 a greater distance than guide support top 13, providing a shelf to assist in guiding sheet metal stock 23 into slot 25. In this specification, the term inward refers to the direction toward metal sheet stock 23 as it is in the position illustrated in FIG. 3 and the term outward refers to the direction away from metal sheet stock 23.

Front handle 20 is a generally axial extension of shank 22 from the end of the shank 22 proximal from the distal gripping section. Front handle 20 is similar in shape to the common pentagonally-shaped handle of a common shovel and comprises a hand grasping means 26 and extension means 27 extending from shank 22 to support and to connect hand grasping means 26 to shank 22. Extension means 27 can be angled horizontally outward from shaft 22, such that front handle 20 angles horizontally outward and away from sheet metal stock 23 when sheet metal stock 23 is being gripped in puller 10. This angle is for both efficiency and safety: the angle allows for a more natural body positioning and pulling motion by the worker; and the angle positions the worker's hand a greater distance from the sheet metal stock 23 during the pulling operation. This angle is not necessary when a hand shield 21 is provided as shown in the Figures. The extension means can be gently angled as shown in FIG. 4 or sharp angles utilized as it extends from shank 22 to the hand grasping means 26.

Rear handle 19 is a generally outwardly extending horizontal extension from shaft housing 24 on the side of shaft housing 24 opposite to cam 14. Rear handle 19 is a generally rod-like structure. The presence of two handles 19, 20 allow for greater ease of manipulation of puller 10, greater pulling force by the workers, and as a safety measure allowing the workers to place both hands on the puller thus discouraging unsafe movements by an otherwise free hand. The handles 19, 20 can be of any convenient shape. They can be of a simple unitary construction as illustrated or have ridges for better gripping by the fingers as deemed desirable. A hand shield 21 is provided to protect the hand from contact with the sharp edges of the sheet metal stock 23. Hand shield 21 is a generally vertical planar member attached to shank 22 at the proximal edges of guide support base 12 and guide support top 13. Hand shield 21 has the approximate dimensions of front handle 20 and is located between front handle 20 and metal sheet stock 23 when the metal sheet stock is being gripped, providing a barrier between metal sheet stock 23 and the worker's hand when gripping the handle 20. The proximal vertical edge of hand shield 21 may curve slightly outward as shown in FIG. 4 to minimize edge contact with, and possible damage to or by, sheet metal stock 23.

As it is desirable for the puller 10 to be light and easy to handle, it can be constructed of a light material such as aluminum. In this case it may be necessary to have brass wear plates 28 as the top surfaces 18 on the guide support base 12 and pressure plate 11 in order to prevent excessive wear. Wear plates 28 prevent the sheet metal stock 23 from abrading and destroying pressure base 11 and guide support base 12. As wear plates 28 wear, they can be replaced. Teeth 16 also are made from a material with good wear characteristics. Cam 14 can be replaced as teeth 16 wear. Obviously, puller 10, wear plates 28 and teeth 16 can be constructed of any suitable materials, preferably metals and alloys such as aluminum, steel, iron, brass, titanium, nickel, zinc and the like, and combinations of these metals.

The puller 10 is operated by guiding it onto the sheet metal stock 23 so that the sheet metal stock 23 rests within slot 25 between guide support base 12 and guide support top 13 and between pressure plate 11 and offset tooth cam 14, as shown with ghost lines in FIG. 3. When it is in proper position, puller 10 is pulled to the left, as indicated by the arrows in the drawings, or away from the roll, to grip the sheet metal stock 23. When sheet metal stock 23 is in proper position, its edge generally abuts shank 22, or at least the inner portions of the distal gripping section and the central guiding section. The sheet metal stock 23 also may contact the hand shield 21. Lobe 17 rests on the upper surface of sheet metal stock 23 and actually may need to be rotated upward upon insertion of the sheet metal stock 23 into the puller 10. When the puller 10 is pulled in the direction of pull, the offset tooth cam 14 rotates until the lobe 17 of the cam 14 is nearly directly over and close to the sheet metal stock 23 as shown in FIG. 1. The teeth 16 lock the sheet metal stock 23 in position by both forcing the sheet metal stock 23 against the pressure base 11, and by the teeth 16 digging into the sheet metal stock 23 while the sheet metal stock 23 is being pulled and fed into a stamping machine (not shown). The sheet metal stock 23 is stopped by the front part of the shaft housing 24 and the front pan of the shank 22 from penetrating the puller 10 to a depth which might result in injury to the worker's hands.

The puller 10 can be disengaged from the sheet metal stock 23 by pushing the puller 10 in the opposite direction of the arrows in the drawings, or toward the roll. This will tend to rotate the offset tooth cam 14 in the opposite direction until the lobe 17 is away from the sheet metal stock 23 and the teeth 16 become disengaged from the sheet metal stock 23. Pushing the puller in this opposite direction releases the pressure that the teeth 16 have placed on the sheet metal stock 23. Once that has happened, the puller 10 can be taken back to the roll of metal stock and the gripping and pulling process repeated again.

Depending on coil width, it is generally desirable to use sheet metal stock pullers 10 in tandem with one on each side of the sheet metal stock 23. These sheet metal stock pullers 10 will be a mirror images of each other with one used on each side of the sheet being pulled.

The depth and configuration of the teeth 16 and the extent of the lobe 17 in the offset tooth cam 14 can depend upon the sheet metal stock being pulled. It is desirable that these teeth 16 firmly grip the sheet metal stock 23 but not make substantial indentations in it. The design of the teeth 16 and the extent of the lobe 17 and the distance between the teeth 16 and the top surface 18 of the pressure base 11 can be determined at the time the puller 10 is designed based upon the sheet metal stock 23 to be pulled. If this puller is to be used for sheet metal stock of different thicknesses, the offset tooth cam 14 can be replaced with a different size lobe 17 and teeth 16 of different depth. Alternatively, the cam 14 can be sized for general use by allowing teeth 16 to touch pressure base 11 when lobe 17 is in its downward most position, and allowing a predetermined distance, equal to or slightly greater than the thickness of the thickest sheet metal stock 23 generally used in the specific location.

Means can be employed to prevent cam 14 from rotating more than a few degrees about shaft 15. For example, a circular slot (not shown) can be placed on the inward surface of the shaft housing 24 under cam 16 with a pin extending into the slot from the back of cam 14 in such a way that the cam 16 can only rotate the number degrees desired, defined by the length of the slot. This prevents the cam 14 from rotating too far upwards so that the lobe 17 is on or near the top of the cam 14 and the teeth 16 are out of contact with the sheet metal stock 23 when the sheet metal stock 23 is inserted between the cam 14 and the pressure base 11.

It can be seen that this device is not only efficient but it protects the workers from hand injuries because the workers do not have to touch the sheet metal stock, and the workers' hands are protected by shields. This device does not require the clamping and unclamping steps required when "C-clamps" are used because of its self clamping feature achieved by the cooperation between the offset cam and the pressure plate in clamping and unclamping the sheet metal stock. Because of the guides and the structure of the device between the hands of the worker and the sheet metal the number of hand injuries is drastically reduced.

This invention is especially useful for pulling any type of relatively thin material stock off of a coil. While the main application of this puller is for moving sheet metal stock off of a coil, it should be realized that it can be used to move many other types of materials as well, as long as they are in sheet form (i.e. material that is relatively thin in comparison to its length).

While the invention has been described in preferred forms only, it will be obvious to those skilled in the art that many modifications, additions, and deletions may be made therein without departing from the spirit and scope of the invention, and its equivalents, as set forth in the following claims.

I claim:

1. A sheet puller comprising a frame having a pressure plate with a top surface, a guide support base also with a top surface, said guide support base top surface being in the same plane as said pressure plate top surface, a guide support top placed above said guide support base defining a slot between them so as to receive the sheet in said slot between them, a rotatable offset cam affixed to a shaft supported by the frame, said cam having a lobe with a circumference and teeth, said teeth being on the circumference of said cam, at least at said lobe, said cam being placed above said pressure plate top surface, said teeth being designed to engage the sheet when brought into contact with the sheet, said puller having handle means to facilitate moving the puller so that when the puller is moved in one direction, said cam is rotated to move said lobe towards the sheet so that the teeth engage the sheet so the puller and the sheet can be moved together, and when the puller is moved in the opposite direction said lobe is moved away from the sheet so that the teeth become disengaged from the sheet thereby releasing the sheet from the puller.

2. The sheet puller of claim 1, wherein the handle means comprises a front handle and a rear handle attached to the frame for moving any sheet engaged in the puller.

3. The sheet puller of claim 2, further comprising a hand shield placed between said front handle and the sheet engaged in the puller.

4. The sheet puller of claim 1, wherein said cam rotates towards and away from the guide support top and the guide support base.

5. A sheet metal stock puller comprising a frame having a pressure plate with a top surface, a guide support base also with a top surface, said guide support base top surface being in the same plane as said pressure plate top surface, a guide support top placed above said guide support base defining a slot between them so as to receive the metal stock in said slot between them, a rotatable offset toothed cam affixed to a shaft supported by the frame, said cam having a lobe with a circumference and teeth, said teeth being on the circumference of said cam, at least at said lobe, said cam being placed above said pressure plate top surface, said teeth being designed to engage the sheet metal stock when brought into contact with the metal stock, said puller having handle means to facilitate moving the puller so that when the puller is moved in one direction said cam is rotated to move said lobe towards the sheet metal stock so the teeth engage the stock, and when the puller is moved in the opposite direction, said lobe is moved away from the stock so the teeth become disengaged from the stock and the stock can be released from the puller.

6. The sheet puller of claim 5, in which said pressure plate top surface and said guide support plate base top surface are constructed of brass.

7. The sheet metal stock puller of claim 5, in which the said handle means comprises a front handle and a rear handle attached to the frame for moving any sheet metal stock engaged in the puller.

8. The sheet metal stock puller of claim 7, further comprising a hand shield placed between said front handle and the sheet metal stock engaged in the puller.

* * * * *